Figure 1:
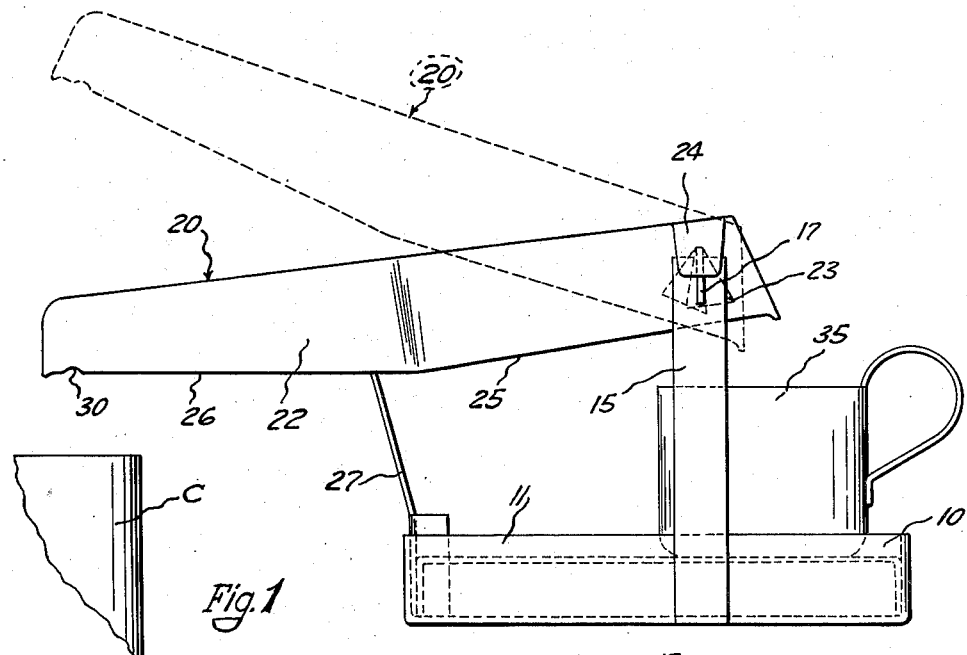

Sept. 26, 1950      R. WHITE      2,523,546

EGG BREAKING AND INSPECTING DEVICE

Filed Oct. 21, 1947      2 Sheets-Sheet 1

RICHARD WHITE
INVENTOR.

BY *R. Hastings Ackley*

ATTORNEY

Sept. 26, 1950　　　　　R. WHITE　　　　　2,523,546
EGG BREAKING AND INSPECTING DEVICE

Filed Oct. 21, 1947　　　　　　　　　　　　2 Sheets-Sheet 2

RICHARD WHITE
INVENTOR.

BY *Eg Hastings Ackley*

ATTORNEY

Patented Sept. 26, 1950

2,523,546

UNITED STATES PATENT OFFICE 2,523,546

EGG BREAKING AND INSPECTING DEVICE

Richard White, Denison, Tex.

Application October 21, 1947, Serial No. 781,105

11 Claims. (Cl. 146—2)

This invention relates to new and useful improvements in egg breaking and inspecting devices.

In the preparation of eggs for freezing and drying into powdered form, whereby the eggs may be stored for long periods and shipped for considerable distances without spoilage, it has been the common practice to break the egg shell and deposit the contents in a cup or other receptacle for inspection for freshness prior to depositing the eggs in a general container. Thus, the operator broke the egg into the receptacle, smelled the egg, looked at the egg in the receptacle for color and condition, then deposited the egg in the principal container if good, or deposited the egg in a waste container if bad. Such operation required handling and manipulation of the receptacle to deposit the egg in the proper container, resulting in a considerable loss of time and motion in such handling.

It is, therefore, one object of this invention to provide an improved device for the breaking and inspecting of eggs with minimum handling by the operator.

An important object of the invention is to provide an egg breaking and inspecting device which is so constructed and arranged that each egg is separately held or maintained in position for inspection after it is broken and is prevented from entering a container with eggs previously so inspected and determined good, and wherein each subsequent egg broken in the device displaces the good egg previously broken but itself remains in position for inspection and acceptance or rejection.

A particular object of the invention is to provide an egg breaking and inspecting device which provides for stopping the egg at an inspection position, preventing the egg from immediately flowing or sliding into the principal good egg container, and which is so arranged that a subsequently broken egg automatically and without manipulation by the operator displaces the good egg from the inspection position into the principal container.

Another object of the invention is to provide a device of the character described wherein the eggs which are determined to be bad upon inspection are disposable into a separate container, whereby contamination of the good eggs is prevented.

A further object of the invention is to provide an egg breaking and inspecting device which is easy to remove and clean when a bad egg has been broken into the device, whereby the device is easily maintained in a sanitary condition.

Still another object of the invention is to provide an egg breaking and inspecting device which is simple in structure and economical to manufacture, and which permits of use by an operator without special skill or long periods of training.

Figure 2:
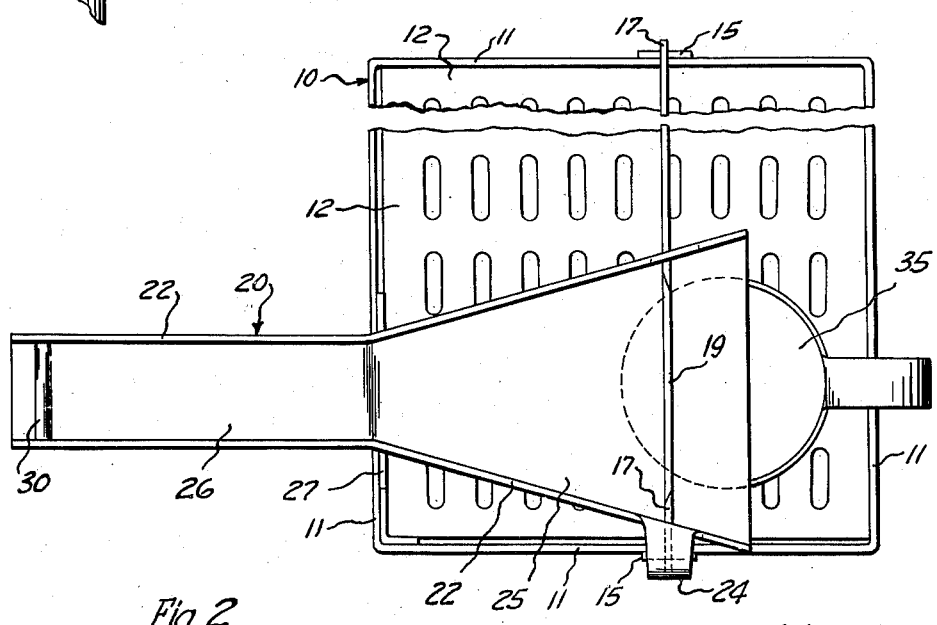
Figure 3:
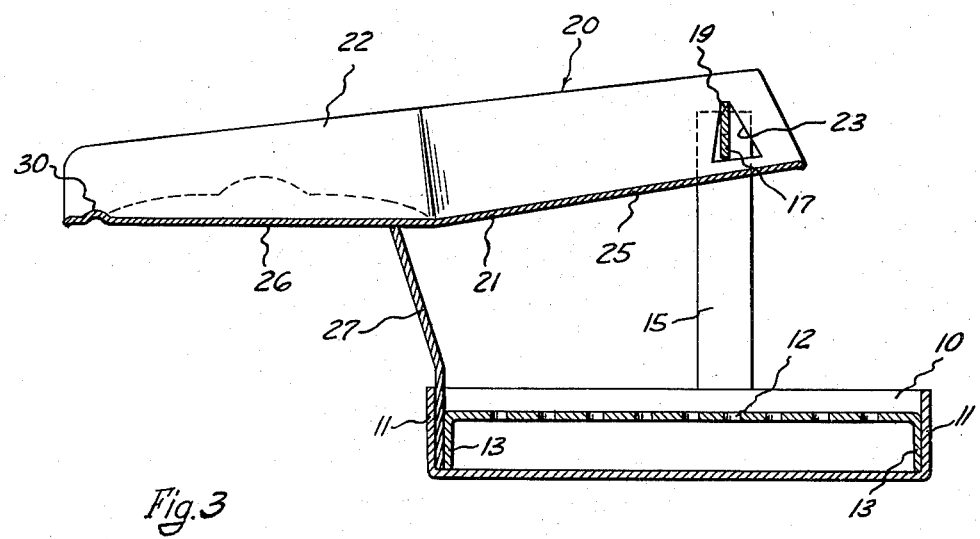
Figure 4:
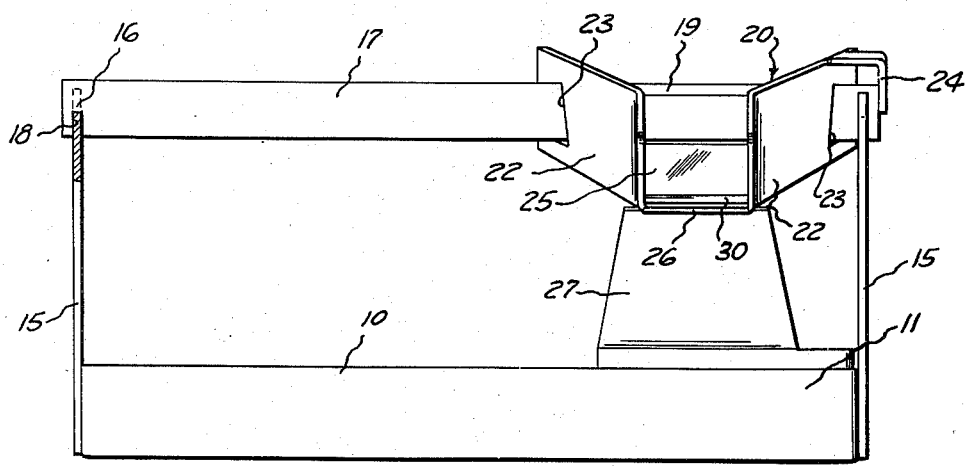

Additional objects and advantages of the invention will readily be apparent from the reading of the following description of a device constructed in accordance with the invention, and reference to the accompanying drawings thereof, wherein:

Figure 1 is a side elevation of a device constructed in accordance with the invention, showing the device in operative position, Figure 2 is a plan view of the device of Figure 1, Figure 3 is a transverse, vertical sectional view of the device, showing the structure of the tray and the trough, and Figure 4 is a front elevation of the device.

In the drawings, the numeral 10 designates a substantially rectangular pan having side walls 11 and forming a base member for the egg breaking and inspecting device. The pan may take a shape other than rectangular if desired, the exact shape having no bearing upon the invention. A perforated platform 12 is supported on legs 13 within the pan, and the upper surface of the platform is disposed below the upper edges of the side walls 11 of the pan.

A pair of uprights 15 are rigidly secured to, or formed integral with, opposite side walls of the pan and extend a substantial distance above the upper edge of such side walls, as clearly shown in Figures 1 and 3. Each upright is provided with a narrow vertical notch 16 at its upper end for receiving an elongate cross piece 17. Narrow transverse notches 18 are formed in the cross piece near each end and are adapted to engage over the upper end of each upright, as clearly shown in Figure 4, to retain the cross piece in position on the upright and prevent longitudinal displacement therefrom. A substantial portion of the upper edge of the cross member 17 is beveled near one end as indicated at 19, in Figures 2 and 4, to provide a knife edge for ready breaking of egg shells.

An egg receiving trough 20, having a bottom 21 and side walls 22 is pivotally supported near one end on the cross piece 17 and disposed under the knife edge 19 so that eggs broken on such knife edge will drop from the shell into the trough. For pivotally mounting the trough on the cross piece, the side walls of the trough are provided with substantially triangular openings 23 near one end, and the cross piece 17 extends through these openings and engages against the apex of the opening, whereby the trough may be swung through an arc in the manner illustrated in Figure 1, the triangular opening permitting such limited movement. One side wall of the trough is provided at its inner end with an outwardly and downwardly projecting retaining arm 24 which is so positioned that the downwardly turned portion of the retaining arm engages against the outer end of the cross piece 17 to retain the trough in proper operative position with respect to the knife edge 19 as the trough is used and swung in an arc upon the cross piece.

The bottom 21 of the trough is so formed that its inner portion 25 is inclined downwardly from the end nearest the cross piece to a point substantially midway of its length, as clearly shown in Figure 3. The outer portion 26 of the trough is disposed at an oblique angle to the inner portion 25, and is adapted to be maintained in a substantially horizontal position by a support arm 27, which is removably interposed between the platform 12 and one side wall 11 of the pan 10 and extends upwardly and outwardly to a position at which it will engage the outer portion 26 of the bottom of the trough to maintain said outer portion in a substantially horizontal plane. If desired, of course, the support member 27 may be formed integral with the side wall of the pan, rather than being removable.

The inner portion of the trough 20 is flared outwardly from the mid-portion of the trough to the inner end thereof, as clearly shown in Figures 2 and 4, to provide an amplified receiving surface below the knife edge 19. The outer portion of the trough is narrow and substantially rectangular in shape, as clearly shown in Figure 2, and the extreme outer end of the trough is open and has a downwardly turned lip to permit the eggs to flow from the trough into a suitable container C therebelow, in a manner which will be hereinafter described.

An upwardly protruding transverse rib 30 is formed near the extreme outer end of the outer portion 26 of the bottom of the trough, and this rib provides an obstruction to the flow of an egg along the trough, whereby the egg is halted by the obstruction and maintained in the position showed in dotted lines in Figure 3, so that the egg may be inspected for color and condition and pieces of shell or the like removed prior to the egg being deposited in the container C.

If, upon inspection of the egg, and smelling the interior of the shell, the operator determines the condition of the egg to be bad so that it should be rejected, the outer end of the trough 20 is lifted to the position shown in dotted lines in Figure 1, whereupon the egg will slide from the outer portion of the trough back along the inner portion and out the open inner end of the trough into a suitable bad egg container, such as the cup 35 which is supported upon the platform 12 in the pan 10 below the inner end of the trough. Also, if the egg is determined to be in bad condition and is so disposed in the cup 35, the trough 20 and cross piece 17 are lifted off the upright 15 and, with the cup 35, are carried to a suitable place for cleaning and sterilization. A clean, sterile trough and cross piece are remounted on the uprights 15 and the support 27, and the egg breaking operation is continued.

If the operator determines, upon inspection, that the egg is in good, fresh condition, a subsequent egg is broken on the knife edge 19 and permitted to fall into the inner flared portion 25 of the trough. The egg will flow or slide down the incline and into the narrow outer portion 26 of the trough, and will push or displace the previously broken egg, which had been retained in the narrow inspection portion by the transverse stop rib 30, outwardly over the rib and through the open outer end of the trough into the principal or good egg container C. The size of the outer portion of the bottom 26 of the trough is such that its cross sectional area is sufficient to accommodate the usual egg when the egg is stopped by the transverse rib 30, so that the egg will be stopped therein for inspection. However, its size is also sufficiently small that the second egg flowing down the inclined portion 25 will force the first egg outwardly from the open end of the outer portion 26 of the trough. The first egg will thus be displaced from the narrow outer portion of the trough, but the second egg will be retained therein by the transverse protruding rib 30 and may be inspected for color and condition and have specks or portions of the shell removed therefrom.

If the second egg is determined to be in good, fresh condition, the shell of a third egg is broken on the knife edge 19 and the egg permitted to drop onto the inclined inner portion 25 of the trough and flow downwardly into the narrow outer portion 26 of the trough to displace the previous or second egg from the trough into the container C. The transverse protruding rib 30 will stop the third egg in position for inspection in the narrow outer portion 26 of the trough. If the third egg is determined to be good, a fourth and subsequent eggs may be broken, in the manner just described, on the knife edge 19 and permitted to flow or slide down the inclined inner portion of the bottom of the trough into the horizontal narrow portion 27 to displace the previously halted egg therefrom into the container.

If, however, any subsequent egg is determined to be bad, the trough is lifted, in the manner previously described, to cause the egg to flow or slide in the reverse direction and out the inner end of the trough into the bad egg cup 35, whereby the bad eggs are separated from the good eggs.

From the foregoing, it will be seen that the trough provides for a substantially automatic continuous breaking and inspecting operation. So long as the eggs are in good condition, the operator breaks the shell and deposits the egg in the trough, and the newly deposited egg forces the previous egg out of the trough into the principal container automatically. The operator need only use his hands to lift the broken shell to his nose for smelling and then dispose of the shell, pick up another egg and break the same. There is no manipulation required in transferring the egg from the trough to the container. It is particularly pointed out that each egg is individually stopped in the outer narrow inspecting portion 26 of the trough, and cannot flow into the principal container until the egg has been inspected, and that each subsequently broken egg will displace the previous egg from the trough into the container automatically and without manipulation by the operator.

It is believed manifest that the trough and cross piece 17 may be readily sterilized and cleaned after a bad egg has been broken into the trough, whereby the entire device is easily maintained in a sanitary condition and bad eggs are separated from good. It is further believed readily apparent that the trough is simple in structure and economical to manufacture. The device further permits of use by an operator without special skill or long periods of training, since the operation is substantially automatic throughout, so long as the eggs are in good condition. Furthermore, if an egg is bad, it is simply necessary to lift the outer end of the trough to cause the egg to slide or flow backwardly and out the inner end of the trough into the waste or bad egg cup 35, and the entire trough and cross piece assembly may be removed from the upright and carried to a separate sterilization point and a new or sterile trough and cross piece installed on the upright to permit the egg breaking operation to continue.

The foregoing description of the invention is explanatory only, and changes in the details of the construction illustrated may be made by those skilled in the art, within the scope of the appended claims, without departing from the spirit of the invention.

What I claim and desire to secure by Letters Patent is:

1. An egg breaking and inspecting device including, a support, an elongate trough open on its upper side throughout its length mounted on the support and having a large outwardly and downwardly inclined egg receiving section communicating with a reduced substantially horizontal egg retaining section having an open outlet end, whereby the contents of an egg shell deposited on the inclined section will slide therealong to the substantially horizontal section of the trough, and an obstructive member projecting upwardly from the bottom of the outlet and of the horizontal portion of the trough for initially retaining the egg in the open horizontal portion of the trough for visual inspection, said obstructive member being constructed and arranged to permit another egg subsequently deposited on the inclined portion of the trough to force the previously deposited egg past the obstructive member and out of the trough and being constructed and arranged to retain the subsequently deposited egg in the horizontal portion of the trough for visual inspection.

2. An egg breaking and inspecting device of the character set forth in claim 1 wherein, the elongate trough is swingably mounted on the support at the inner end of the inclined section and the swingable mounting of the trough permits the trough to be swung in an arc elevating the normally horizontal portion of the trough to cause the egg to slide back along said portion and past the inclined portion and out the opposite end of the trough.

3. An egg breaking and inspecting device of the character set forth in claim 1 wherein, the trough is removably mounted on the support member, whereby the trough may be detached and separated from the support member for cleaning and sterilization.

4. An egg breaking and inspecting device including, support means, a cross member carried by said support means, an elongate egg receiving trough open on its upper side throughout its length and having openings in its side walls at one end whereby it may be mounted on the cross member, said mounted end of the trough having a large outwardly and downwardly inclined portion communicating at its lower portion with an elongate reduced normally horizontal portion having an open outlet end, and a transverse upwardly projecting stop member at the outer end of the horizontal portion of the trough constructed and arranged to stop and retain an egg deposited in the inclined portion of the egg trough and permitted to flow or slide into the horizontal portion of said trough, said stop member retaining the egg in the reduced horizontal portion of the trough for visual inspection and being so constructed and arranged that an egg subsequently deposited in the trough and flowing down the inclined section into the horizontal portion will displace the previously deposited egg past the stop member and out of the trough.

5. An egg breaking and inspecting device of the character set forth in claim 4 wherein, the trough and cross member are removably mounted on the support so as to be separable therefrom, whereby the cross member and trough may be cleaned and sterilized independently of the support.

6. An egg breaking and inspecting device including, a base member, spaced uprights on the base member, a cross-member carried by the uprights and spaced from the base member, an elongate receiving trough open on its upper side throughout its length swingably mounted near one end on the cross-member and having an inclined portion communicating with a reduced normally horizontal portion and open ends, a support member on the base member arranged to engage and support the trough with the horizontal portion in a horizontal position, and an obstructive ridge projecting upwardly from and at the outer end of the horizontal portion of the trough for initially retaining an egg deposited in the trough in the horizontal portion thereof for visual inspection, said obstructive member being constructed and arranged to permit the egg initially retained in the horizontal portion to be displaced therefrom by another egg subsequently deposited on the inclined portion of the trough and sliding into the horizontal portion thereof.

7. An egg breaking and inspecting device of the character set forth in claim 6 wherein, the swingable mounting of the trough permits the trough to be swung in an arc elevating the normally horizontal outer portion of the trough to cause the egg initially retained therein to slide back along said portion and past the inclined portion and out the opposite inner end of the trough.

8. An egg breaking and inspecting device of the character set forth in claim 6 wherein, the trough and cross-member are removably mounted on the uprights so as to be separable therefrom, whereby the trough and cross-member may be cleaned and sterilized independently of the base member and uprights.

9. An egg breaking and inspecting device of the character set forth in claim 6 wherein, the cross-member extends transversely of the inner inclined portion of the trough and is spaced above the bottom thereof, and said cross-member having its upper edge beveled to provide an egg breaking knife edge above the inner inclined portion of the trough, whereby eggs broken on the knife edge fall into the trough upon the inclined inner portion thereof and may flow therefrom into the normally horizontal outer portion of the trough.

10. An egg breaking and inspecting device including, a pan-like base member having a bottom and side walls, a pair of spaced parallel uprights mounted on opposite side walls of the base member and extending substantially thereabove, an elongate cross-member removably mounted on the upper ends of the uprights so as to be spaced from and lie parallel to the base member, an elongate egg receiving trough having a bottom and side walls and open on its upper side throughout its length and at each end and having a large outwardly and downwardly inclined inner portion communicating at its outer lower end with a reduced normally horizontal outer portion, the trough having openings on its side walls near its inner end for receiving the cross-member whereby the inner end of the trough is swingably mounted on the cross-member in such a manner that the inclined bottom of the inner portion of the trough extends under and is spaced below the cross-member, the inner inclined portion of the trough being flared to provide an amplified receiving portion underlying the cross-member, a support carried by the base member and arranged to engage the outer portion of the trough to maintain said outer portion in a normally horizontal position, whereby an egg deposited upon the inclined inner portion of the trough will flow downwardly therealong and into the horizontal portion thereof, an upwardly projecting transverse obstructive ridge formed at the outer end of the bottom of the normally horizontal outer portion of the trough and constructed and arranged to initially retain the egg in the horizontal portion of the trough for visual inspection, said obstructive ridge being so constructed and arranged as to permit another egg subsequently deposited on the inclined inner portion of the trough to force the previously deposited egg past the obstructive ridge and out of the open outer end of the trough, the size of the outer normally horizontal portion of the trough being such that the previously deposited and initially stopped or retained egg is completely forced out of the trough by the subsequently deposited egg, and the obstructive ridge being so positioned and constructed and arranged as to retain the subsequently deposited egg in the horizontal portion of the trough for visual inspection, the swingable mounting of the trough permitting the trough to be swung in an arc elevating the normally horizontal portion of the trough to cause the egg retained therein to slide back along said portion past the inclined portion and out the opposite or inner end of the trough, and a receptacle removably supported on the base member below the inner end of the trough for receiving eggs ejected therefrom.

11. An egg breaking and inspecting device including, a support, an elongate trough open on its upper side throughout its length mounted on the support, said trough having a large open egg receiving chute section at one end downwardly inclined and convergent inwardly toward the mid-portion of the trough and merging with an elongate substantially horizontal reduced open egg retaining section having an open outer end, and an obstructive ridge projecting upwardly transversely of the bottom of the trough at the outer end of the reduced horizontal retaining portion of said trough, whereby an egg deposited in the open inclined chute of the trough will flow downwardly therealong into the horizontal reduced retaining section and will be normally retained in such reduced section by the obstructing ridge so the egg in such retaining section may be visually inspected, the obstructive ridge permitting the egg to pass thereover and be ejected from the open outer end of the reduced retaining portion of the trough by an egg subsequently deposited in the inclined chute section of said trough and flowing from said chute section into the reduced horizontal retaining section.

RICHARD WHITE.

REFERENCES CITED

The following references are of record in the file of this patent:

UNITED STATES PATENTS

| Number | Name | Date |
|---|---|---|
| 247,077 | Lodwick | Sept. 13, 1881 |
| 1,029,902 | Willard | June 18, 1912 |
| 1,494,602 | Jenkins | May 20, 1924 |
| 1,502,770 | Frenier | July 29, 1924 |
| 1,510,683 | Klepach | Oct. 7, 1924 |
| 1,646,682 | Christian et al. | Oct. 25, 1927 |
| 1,892,539 | Regensburger | Dec. 27, 1932 |

FOREIGN PATENTS

| Number | Country | Date |
|---|---|---|
| 12,603 | Great Britain | May 28, 1912 |